United States Patent [19]

Wieland

[11] Patent Number: 5,087,176
[45] Date of Patent: Feb. 11, 1992

[54] METHOD AND APPARATUS TO PROVIDE THERMAL ISOLATION OF PROCESS GAS BEARINGS

[75] Inventor: Kurt H. Wieland, Rolling Hills Estates, Calif.

[73] Assignee: Allied-Signal Inc., Morris Township, Morris County, N.J.

[21] Appl. No.: 684,241

[22] Filed: Dec. 20, 1984

[51] Int. Cl.$^5$ .............................. F04B 17/00
[52] U.S. Cl. ........................ 417/407; 415/177; 415/178
[58] Field of Search ............. 417/407, 408, 409; 415/115, 175, 177, 180, 178; 416/244 A

[56] References Cited

U.S. PATENT DOCUMENTS

| | | |
|---|---|---|
| 2,578,785 | 12/1951 | Davis . |
| 2,680,001 | 6/1954 | Batt . |
| 2,858,101 | 10/1958 | Alford . |
| 2,938,659 | 5/1960 | Judson et al. ............... 415/177 |
| 2,958,458 | 11/1960 | Wood . |
| 3,106,381 | 10/1963 | Leins . |
| 3,149,819 | 9/1964 | Baumann et al. . |
| 3,203,180 | 8/1965 | Price ............................ 415/115 |
| 3,287,907 | 11/1966 | Bill . |
| 3,356,340 | 12/1967 | Bobo . |
| 3,605,441 | 9/1971 | Hagemeister ................ 416/244 A |
| 3,723,022 | 3/1973 | Olson .............................. 417/407 |
| 3,740,163 | 6/1973 | Schinnerer et al. . |
| 3,845,619 | 11/1974 | O'Neill . |
| 3,943,703 | 3/1976 | Kronogard ................... 416/244 A |
| 4,063,850 | 12/1977 | Hueber et al. ............... 416/244 A |
| 4,116,499 | 9/1978 | Laurizio . |
| 4,127,988 | 12/1978 | Becker . |
| 4,133,585 | 1/1979 | Licht ........................... 304/103 |
| 4,156,342 | 5/1979 | Korta et al. . |
| 4,184,797 | 1/1980 | Anderson ..................... 415/115 |
| 4,198,192 | 4/1980 | Webb . |
| 4,261,165 | 4/1981 | Burgermeister et al. . |
| 4,295,689 | 10/1981 | Licht ........................... 384/103 |
| 4,364,717 | 12/1982 | Schippers et al. . |
| 4,376,617 | 3/1983 | Okano et al. . |
| 4,549,821 | 10/1985 | Kawakami ................... 384/103 |

FOREIGN PATENT DOCUMENTS 604730  7/1948  United Kingdom .......... 416/244 A Primary Examiner—Louis J. Casaregola
Assistant Examiner—T. S. Thorpe
Attorney, Agent, or Firm—Henry M. Bissell; James W. McFarland; David B. Abel

[57] ABSTRACT

Apparatus for cooling pliant film bearings of turbomachinery or the like and for protecting such bearings against heat transfer from the turbine side of the machinery. The turbomachine incorporates a hollow shaft for better cooling. Embodiments of the invention circulate cooling air through the interior of the hollow shaft and provide various structural configurations to thermally isolate the bearing shaft from the turbine wheel.

18 Claims, 2 Drawing Sheets

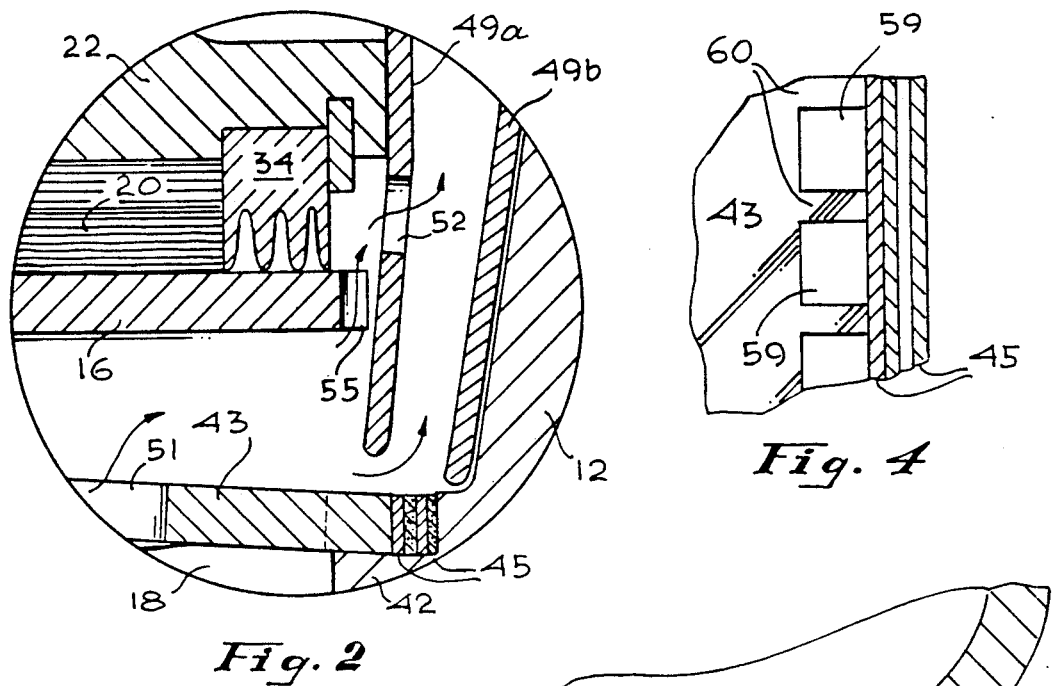
Fig. 2
Fig. 3
Fig. 4
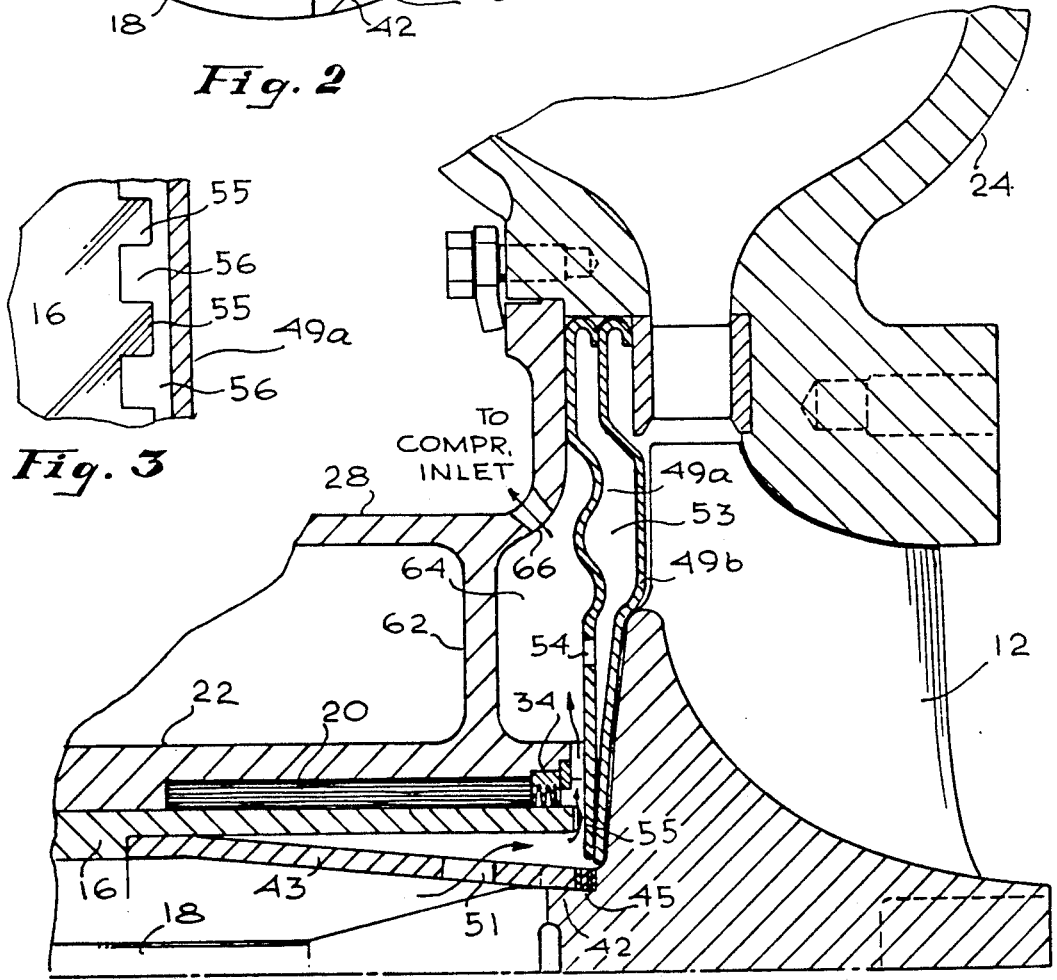
Fig. 5

METHOD AND APPARATUS TO PROVIDE THERMAL ISOLATION OF PROCESS GAS BEARINGS

BACKGROUND OF THE INVENTION

1. Field of the Invention

This invention relates to gas lubricated bearings associated with the rotating shafts of gas turbines and turbocompressors and, more particularly, to arrangements for protecting such bearings from excessive heat from the associated machinery.

2. Description of the Prior Art

In gas turbine engines, or any other machinery in which high temperature rotors are situated adjacent high speed bearings, it is essential to maintain the bearings at an acceptably low temperature. This is normally achieved, when the engine is running, by providing the bearings with an adequate supply of lubricating oil from a pump driven by the engine However, this supply of cooling oil ceases when the engine stops, and the residual heat in the turbine rotor can be sufficient to damage the bearings adjacent the turbine rotor Such bearings are especially vulnerable to the effect of heat-soak in the case of a gas turbine engine having a regenerative heat-exchanger and a thermally insulated main casing, because the residual heat in the turbine rotor on shutdown is virtually prevented from being dissipated to atmosphere.

Bearings located adjacent to turbine rotors are exposed to temperatures which are sometimes higher than is desirable because of conduction and the radiation of heat from the elevated temperature rotor. This may occur during steady state operation as well as after shutdown due to transfer of heat from the hot turbine wheels through the thermally conducting shaft to the bearings In either case, the temperature rise occurring in the bearings may be more than can be tolerated by either the materials of which the bearing is constructed or the lubricant.

Gas lubricated bearings are being considered to overcome the problem of lubricant breakdown, especially that which is due to soak-back after shutdown of the machine. Although the use of such gas bearings reduces the magnitude of the problem considerably, certain limitations on the maximum temperature of the bearings must be observed. These limitations relate to the materials used in the bearings, primarily the coatings which are provided as anti-friction coatings for startup and shutdown when the rotational speed of the bearing journal is insufficient to maintain the gas film. In addition, the foils or elastic members of the gas bearings may be made from a material which provides the necessary compliance and elasticity at normal operating conditions while having to exhibit certain properties dictated by the specific application, such as compatibility with certain chemicals, corrosion resistance, etc. Because of such requirements, it may not be possible to use materials which are capable of withstanding the higher operating temperatures of conventional equipment.

Typical materials which are used as coatings on gas bearing foils are: Teflon, polyimide or other elastics, plastics, ceramics and, for the pliant bearing foils, beryllium copper, beryllium nickel, stainless steel, etc. It is important that the material limits and restrictions be maintained in order to provide the desired service life of the machinery. If the temperature exceeds acceptable limits, there may be a loss of wearability of the foil coatings or, in the extreme case, evaporation and destruction of the coating. Similarly, the foil material may creep if the temperature is too high, with attendant loss of elasticity and load bearing capacity.

In general, gas bearings usually require relatively large surface areas. From the standpoint of heat dissipation from the bearing, the larger surface area improves the capability to conduct heat through the shaft. Furthermore, the performance of gas bearings is enhanced if the shaft is constructed from a material with higher thermal conductivity. such as low alloy steels and certain copper alloys. Indeed, some prior art apparatus make special provision to improve the heat dissipation capability of bearings. Examples of such in the prior art may be found in O'Neill U.S. Pat. No. 3 845 619 (compacted copper powder in hollow shaft for heat conduction); Laurizio U.S. Pat. No. 4,116,499 (heat conducting spikes in Teflon bearing pad); Burgermeister et al U.S. Pat. No. 4,261,165 (heat conducting element between bearing sleeve and housing); and Baumann et al U.S. Pat. No. 3,149,819 (conducting inserts in shaft). Such arrangements help to dissipate heat that may develop from imperfections of the bearing foil geometry in conjunction with less than optimum gas films during startup or instantaneous overload. However, while such heat conducting capability is desirable from the standpoint of assisting in dissipating heat from the bearing, it may also tend to increase the heat transfer to the bearing from equipment mounted on the shaft, such as a high temperature rotor, for example.

Recognizing the latter problem, various patentees have disclosed attempts to block heat transfer toward the bearings from an associated heat source. Examples of such prior art are found in Judson et al U.S. Pat. No. 2,938,659 (interruption of the engaging surfaces with grooves and slots, and provision of a baffle); Wood U.S. Pat. No. 2,958,458 (provision of an air space in the direct heat flow path); Leins U.S. Pat. No. 3,106,381 (use of thin metal parts for lower heat conductivity); Korta et al U.S. Pat. No. 4,156,342 (provision of spaces for cooling air paths in the bearing); Webb U.S. Pat. No. 4,198,192 (heat shield shrouds and use of spacers to define dead air spaces); and Schipper et al U.S. Pat. No. 4,364,717 (spacing of bearing housing from turbine housing with means for permitting cooling air flow through the inter-housing gap).

Other patentees, including Schippers et al, have disclosed the use of bleed air taken from the compressor to cool particular components in turbomachinery, such as turbine blades, turbine exhaust, bearings and/or interstitial spaces within the machinery. Examples of such prior art, some of which also incorporate various ones of the features mentioned hereinabove, include Okano et al U.S. Pat. No. 4,376,617; Becker U.S. Pat. No. 4,127,988; Schinnerer et al U.S. Pat. No. 3,740,163; Bobo U.S. Pat. No. 3,356,340; Bill U.S. Pat. No. 3,287,907; Alford U.S. Pat. No. 2,858,101; Batt U.S. Pat. No. 2,680,001; and Davis U.S. Pat. No. 2,578,785. In Bill, although the engine has hollow shafts, the ends of these shafts are closed and the cooling air is directed along the outside of the bearings and then pressurized by a centrifugal pump to introduce it into a region of the jet exhaust where elevated pressure is encountered.

As may be seen from a consideration of the plethora of different approaches to solving the bearing protection problem, no one solution has found universal acceptance. Efforts are still going forward to realize an improved and effective arrangement for protecting gas lubricated bearings, such as are used in association with turbomachinery, from the high operating temperatures of the turbine and from soak-back of residual heat when the turbine shuts down.

SUMMARY OF THE INVENTION

In brief, arrangements in accordance with the present invention provides improved means for both cooling pliant film bearings in turbocompressors or the like during operation and protecting such bearings by restricting heat transfer from a hot source, such as a turbine wheel, after shutdown of the machinery.

One arrangement in accordance with the present invention utilizes a hollow journal shaft and provides for directing process gas, drawn from the compressor and circulated through the bearing foils, into the interior of the hollow shaft to effect cooling thereof. Openings are provided in shaft mounting structures at opposite ends of the shaft to permit the gas to enter from the bearing foils, flow along the interior of the shaft and then exit the bearing, either to ambient atmosphere or to return to the compressor inlet. The gas exit end of the hollow shaft adjacent the turbine wheel may be provided with a plurality of radially directed slots which, during rotation of the shaft in operation of the machine, develop a centrifugal pumping action to further direct the flow of the cooling gas through the shaft. One or more radiation shields in the form of thin disks extending along the back side of the turbine wheel, preferably constructed of a low thermal conductivity metal such as stainless steel with a polished surface to reflect thermal radiation, are mounted in a space between the turbine wheel and the adjacent end of the hollow shaft. The cooling gas exiting the adjacent end of the hollow shaft may be directed between the disks, and through apertures provided in those disks remote from the turbine to further improve the effectiveness of the bearing cooling arrangement.

In accordance with a further aspect of the invention, a special configuration of the hollow shaft, coupled with insulation rings used as thermal barriers, serves to restrict heat transfer from the hot turbine blade to the bearing journal, thereby serving to protect the bearing from excessive heat both during operation and after shutdown. This configuration incorporates an intermediate shaft which extends from a point near the turbine wheel to a remote coupling with the shaft proper, thereby maintaining a gap between the main shaft and the turbine wheel. The contact area between the intermediate shaft and the turbine wheel hub is limited in extent in order to restrict the heat flux. Furthermore, the region where the intermediate shaft joins the main shaft is remote from the bearing journal, thereby providing a long path for heat to travel to the bearing journal. The insulation rings between the turbine wheel and the intermediate shaft act as additional thermal barriers. Both the insulation rings and the intermediate shaft are constructed of low thermal conductivity materials in order to present maximum resistance to heat transfer.

Although the particular embodiments of the invention which are shown in the drawing and described herein are disclosed in the context of protecting a hollow bearing shaft from the adverse effects of heat developed in an adjacent turbine driving the shaft, the same principles and similar structures may be applied to isolating the bearing from cold sources, such as cryogenic expander turbines, where such will improve turbine performance by reducing heat leakage into the process stream.

BRIEF DESCRIPTION OF THE DRAWING

A better understanding of the present invention may be had from a consideration of the following detailed description, taken in conjunction with the accompanying drawing in which:

FIG. 2 is an enlarged view of a portion of FIG. 1;

FIG. 3 is a plan view of a portion of the structure shown in FIG. 2;

FIG. 4 is a plan view of another portion of the structure shown in FIG. 2; and

FIG. 5 is a partial sectional view showing a schematic representation of a further embodiment of the invention.

DESCRIPTION OF THE PREFERRED EMBODIMENTS

Figure 1:
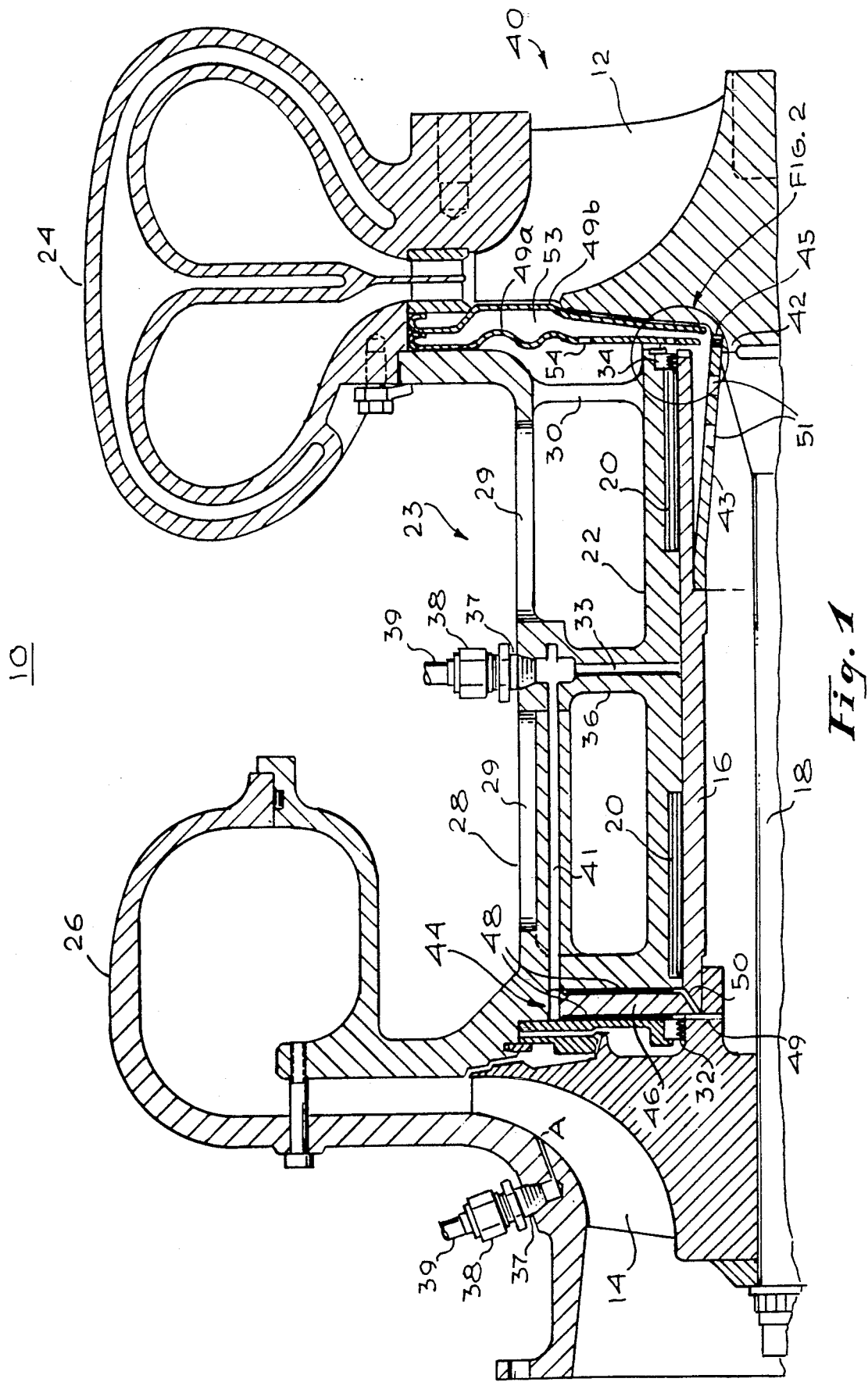
FIG. 1 is a schematic representation in cross-section of a turbocompressor assembly incorporating one particular embodiment of the invention.

FIG. 1 is a partial sectional view of a turbocompressor assembly 10 incorporating one particular arrangement in accordance with the present invention. The turbocompressor 10 incorporates a sub-assembly 40 comprising a turbine wheel 12 and compressor wheel 14 mounted on a hollow shaft 16, the entire sub-assembly being tied together by a central tie bolt 18. The shaft 16 is a journal bearing shaft supported on pliant film bearings, represented schematically by the reference numeral 20, mounted within a bearing housing 22. The bearing housing 22 is part of a cylindrical spacer or separator member 23 which extends between respective housings 24 and 26 of the turbine wheel 12 and the compressor wheel 14. The member 23 is provided with a thin outer cylindrical portion 28 having a plurality of longitudinal slots 29 and, at the turbine end of the bearing, is tied to the bearing housing 22 by a plurality of spokes 30. A conventional labyrinth seal 32 on the compressor side contacts adjacent rotating portions of the compressor wheel 14 to limit the escape of gas from the compressor into the central section of the turbocompressor 10. A corresponding labyrinth seal 34 is mounted in position against the right-hand end of the hollow shaft 15 to prevent contaminants such as combustion products from the turbine 24 from reaching the bearing foils 20.

Approximately midway between opposite ends of the separator member 23 is a hollow radial member 36 which extends between the separator spider 28 and the bearing housing 22. This radial member or spoke 36 has been drilled to provide a central bore 33 extending downward through the bearing housing 22. The outer end of the hollow spoke 36 is tapped to receive an adaptor 37, to which is threaded a retaining nut 38 on a section of flared tubing 39 leading to a corresponding set of fittings 37, 38 and 39 which communicate with a passage into the compressor 26 to draw pressurized gas therefrom at point A. The separator 28 is also drilled to provide an axial passage communicating with the hollow bore 33 at the spoke 36 to receive gas introduced from the compressor via the tubing 39.

The hollow shaft member 16 rotates within the journal bearings 20 and has, at the end adjacent the compressor 26, a thrust bearing 44 comprising a thrust bearing runner 46 which is integrally formed with the hollow shaft 16 and which rotates between thrust bearing foils 48. Pressurized gas is directed to the thrust bearing 44 via the axial passage 41. Small drilled passages 49 and 50 are provided to carry gas from the thrust bearing foils 48 and the journal bearing foils 20 adjacent the thrust bearing 44 to the interior of the hollow shaft 16.

The opposite end of the shaft 16, adjacent the turbine 24, is radially spaced from the hub of the turbine wheel 12. A long thin-walled, generally frusto-conical support member 43 is mounted on the hub 42 and adjacent end of the tie bolt 18 and is joined to the hollow shaft 16 near the mid plane thereof The support member 43 is formed of low thermal conductivity material, such as stainless steel or titanium and can be considered an intermediate hollow shaft generally concentric with the hollow shaft 16 and extending at a shallow angle radially inward therefrom. This intermediate shaft 43 thus inhibits the transfer of heat to the hollow shaft 16. Further resistance to heat flow from the turbine wheel 12 into the intermediate shaft 43 and toward the hollow shaft 16 is provided by a plurality of thin insulating rings 45 which are situated surrounding the hub 42 between the turbine wheel 12 and the end of the intermediate shaft 43. These insulation rings 45 are formed of a material with high thermal resistance, such as titanium, glass filled mica, ceramics (such as silicon nitrate) and the like. To further reduce exposure of the bearings to heat from the turbine, one or more radiation shields 49 may be arranged between the bearing and the hot turbine wheel 12. In the embodiment of FIG. 1, these are in the form of thin-walled disks 49a, 49b, preferably of stainless steel having polished surfaces for reflecting heat back toward the turbine.

Details of the arrangement of elements adjacent the turbine end of the hollow shaft 16 are better shown in the enlarged view of FIG. 2. It will be noted that the intermediate shaft 43 is provided with a plurality of openings such as 51 to transmit gas flowing axially along the interior of the hollow shaft 16. Similar openings 52 are provided in the radiation shield 49a and there is also clearance for the passage of air between the inner end of the shield 49a and the intermediate shaft 43 Gas from the interior of the hollow shaft 16 thus flows in the directions of the arrows shown in FIG. 2, through the holes 51, 52 and upwardly into a chamber 53 between the shields 49a, 49b. Other openings 54 (FIG. 1) are provided in the shield 49a to permit gas traversing the chamber 53 to be released into the region outside the bearing housing 22 where it can exit to ambient atmosphere through the slots 29.

FIG. 3 is a plan view of a portion of the end of the hollow shaft 16, shown adjacent the shield 49a. As shown in FIG. 3, the end of the shaft 16 is notched with a plurality of slots 56 and teeth 55 which serve to define a plurality of radially directed passages for gas from the interior of the hollow shaft 16. During rotation of the wheel and shaft sub-assembly 40, these slots and teeth 56, 55 develop a centrifugal pumping action which assists in moving the cooling gas through the hollow shaft 16.

A somewhat similar configuration of slots 59 and teeth 60 is shown in FIG. 4 for the end of the intermediate shaft 43 adjacent the thermal barrier rings 45, but for a different purpose. The thin teeth 60 and separating spaces 59 serve to develop a limited area for heat to flow from the turbine wheel 12 on the opposite side of the barrier rings 45 into the intermediate shaft 43.

FIG. 5 illustrates a slightly different arrangement in accordance with the present invention wherein a closed exit path leading back to the compressor inlet is provided for gases traversing the interior of the hollow shaft 16. In this embodiment, shown in partial section in FIG. 5 wherein the structure adjacent the turbine wheel 12 is depicted, the bearing housing 22 with bearing foils 20, the hollow shaft 16, the intermediate shaft 43, the labyrinth seal 34 and the barrier rings 45 are essentially the same as in the arrangement depicted in FIG. 1. In the FIG. 5 embodiment, a radial wall 62 extends between the outer separator 28 and the bearing housing 22 in place of the spokes 30 of FIG. 1. The wall 62 and the radiation shield 49a form a chamber 64 into which gas is directed from the interior of the hollow shaft 16 outward through passages at the end of the bearing housing. An exit opening 66 to the chamber 64 is formed through the adjacent wall Portion of the separator 28 and fittings such as 37, 38 and tubing 39 may be attached to transport the exhaust gas back to the compressor inlet. With this arrangement, there is a positively driven circulation of gas into the bearing from an elevated pressure point in the compressor, through the hollow shaft and back to the low pressure inlet of the compressor. The movement of gas through the interior of the hollow shaft 16 is assisted in the manner already described by virtue of the centrifugal pumping action developed by the radial passages 55 at the end of the hollow shaft 16. The arrangement of FIG. 5, wherein the gas is drawn from the turbine side of the bearing to the low pressure compressor inlet has the further beneficial result that combustion products and other contaminants which may leak into the bearing area from the turbine are drawn off before they can migrate into the bearing 20.

The present invention has application to turbochargers, gas turbines, hot gas turboexpanders for the chemical industry, and the like. It beneficially limits the heat reaching the bearing journal from the hot turbine wheel, both during operation and following shutdown, while the gas circulating arrangement included in the depicted embodiments serves to cool the bearing and dissipate the heat generated in the bearing during operation In an alternative utilization, the invention can be used to isolate the bearing 16, 20 from cold sources, such as cryogenic expander turbines where the depicted arrangements will improve turbine performance by reducing the heat leakage into the process stream.

Although there have been described above specific arrangements for protecting gas bearings in turbomachinery from excessive heat in accordance with the invention for the purpose of illustrating the manner in which the invention may be used to advantage, it will be appreciated that the invention is not limited thereto Accordingly, any and all modifications, variations or equivalent arrangements which may occur to those skilled in the art should be considered to be within the scope of the invention as defined in the annexed claims.

What is claimed is:

1. Apparatus for protecting turbomachinery bearings against excessive heat comprising:
   a pliant foil bearing having a plurality of foils extending about a rotatable shaft;
   a hollow shaft mounted to rotate within the pliant foil bearing and being coupled to a turbine wheel, at least a portion of the hollow shaft comprising a bearing journal;

axial tie bolt means for coupling the shaft and wheel together in driving relationship at an end of the hollow shaft remote from the wheel, the end of the shaft adjacent the wheel being spatially separated therefrom;

means for recirculating a gas through the hollow shaft to dissipate heat generated within the bearing; and thermal barrier means including an elongated intermediate shaft for isolating the hollow shaft from the hot turbine wheel both during operation and after turbine shutdown.

2. The apparatus of claim 1 wherein the intermediate shaft is constructed of low thermal conductivity material and is situated between the hollow shaft and the turbine wheel to support the hollow shaft.

3. The apparatus of claim 2 wherein the intermediate shaft is positioned within the end of the hollow shaft adjacent the wheel in contact with the interior of the hollow shaft at a position remote from the wheel and with a hub portion of the wheel to support the hollow shaft from said hub while providing an elongated path for heat conduction from the wheel to the hollow shaft.

4. The apparatus of claim 3 wherein the intermediate shaft is generally frusto-conical in shape, the smaller diameter end of the intermediate shaft being affixed to the turbine wheel hub.

5. The apparatus of claim 4 wherein the larger diameter end of the intermediate shaft is affixed to the interior surface of the hollow shaft in a plane near the mid-plane of the hollow shaft.

6. The apparatus of claim 5 wherein one set of bearing foils is mounted on the hollow shaft in a position between the turbine wheel and the junction of the intermediate shaft with the interior surface of the hollow shaft.

7. The apparatus of claim 1 wherein the end of the hollow shaft adjacent the turbine wheel is notched to define a plurality of radially directed gas passages for driving gas therethrough by centrifugal pumping action during rotation of the hollow shaft.

8. The apparatus of claim 7 wherein the intermediate shaft defines a plurality of openings extending between opposite sides of the intermediate shaft for permitting gas to flow from the interior of the hollow shaft through said gas passages.

9. The apparatus of claim 8 further including means defining a chamber for receiving gas flowing outwardly from the interior of the hollow shaft, and means for directing said received gas outwardly from said chamber.

10. The apparatus of claim 9 wherein said chamber defining means comprises a plurality of generally radially directed wall means extending across the back wall of the turbine.

11. The apparatus of claim 10 wherein said wall means comprise thermal radiation barrier members for reflecting radiant heat away from the bearing.

12. The apparatus of claim 11 wherein said barrier means comprise generally thin-walled disk-shaped elements of low thermal conductivity material.

13. The apparatus of claim 9 wherein the apparatus includes a compressor with an inlet and having a compressor wheel mounted on said axial tie bolt means adjacent the end of the hollow shaft which is remote from the turbine wheel and wherein the chamber defining means comprise a thermal radiation barrier member along one side of the chamber adjacent the turbine wheel and a radially extending solid support member for the bearing housing on the side of the chamber remote from the turbine wheel, and further including means for directing gas from said chamber to the compressor inlet.

14. The apparatus of claim 1 wherein the thermal barrier means further include a plurality of insulating rings mounted on a hub portion of the turbine wheel between the intermediate shaft and the turbine wheel.

15. The apparatus of claim 14 wherein the insulating rings are constructed of low thermal conductivity materials.

16. The apparatus of claim 15 wherein the end of the intermediate shaft adjacent the insulating rings is notched to reduce the contact area with the adjacent ring and the hub portion of the turbine wheel.

17. The apparatus of claim 1 wherein the turbomachinery comprises a turbocompressor including a compressor coupled to be driven by the turbine wheel by way of the hollow shaft and intermediate shaft, the gas circulating means including means for directing pressurized gas from a point in the compressor to said bearing foils prior to directing said gas into the interior of the hollow shaft.

18. The apparatus of claim 17 wherein said circulating means includes wall means defining a plurality of gas passages extending from the region of the bearing foils to the interior of the hollow shaft at the end thereof adjacent the compressor.

* * * * *